US008819791B2

(12) United States Patent
Graessley et al.

(10) Patent No.: US 8,819,791 B2
(45) Date of Patent: Aug. 26, 2014

(54) CAPTIVE NETWORK NEGOTIATION INTERFACE AND AUTOMATION

(75) Inventors: Joshua Verweyst Graessley, Sunnyvale, CA (US); Mitch D. Adler, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 12/405,191

(22) Filed: Mar. 16, 2009

(65) Prior Publication Data

US 2010/0235895 A1   Sep. 16, 2010

(51) Int. Cl.
*G06F 7/04* (2006.01)
(52) U.S. Cl.
USPC ............... 726/6; 726/1; 726/2; 726/3; 726/4; 726/5; 726/7; 726/8; 726/9
(58) Field of Classification Search
CPC ...................................................... H04L 63/10
USPC ........................................ 726/1–9; 370/338
See application file for complete search history.

(56) References Cited

U.S. PATENT DOCUMENTS

| 7,257,105 | B2 | 8/2007 | Molteni et al. | |
|---|---|---|---|---|
| 7,284,062 | B2 | 10/2007 | Krantz et al. | |
| 7,483,984 | B1 | 1/2009 | Jonker et al. | |
| 7,512,081 | B2 | 3/2009 | Ayyagari et al. | |
| 7,693,056 | B2 * | 4/2010 | Heissenbuttel et al. | 370/230 |
| 7,761,710 | B2 * | 7/2010 | Lillie et al. | 713/171 |
| 8,191,128 | B2 * | 5/2012 | Nedkov et al. | 726/9 |
| 2003/0061363 | A1 | 3/2003 | Bahl et al. | |
| 2004/0122959 | A1 * | 6/2004 | Lortz | 709/229 |
| 2007/0050426 | A1 * | 3/2007 | Dubal et al. | 707/201 |
| 2007/0250711 | A1 * | 10/2007 | Storey | 713/168 |
| 2007/0293210 | A1 * | 12/2007 | Strub et al. | 455/420 |
| 2009/0279492 | A1 * | 11/2009 | Montemurro et al. | 370/329 |
| 2010/0100951 | A1 * | 4/2010 | Kutt et al. | 726/9 |

OTHER PUBLICATIONS

Leu et al., Running Cellular/PWLAN Services: Practical Considerations for Cellular/PWLAN Architecture Supporting Interoperator Roaming, IEEE Communications Magazine o Feb. 2006, pp. 111-122.*
Schoo et al., Security Mechanisms and Security Analysis: Hotspot WLANs and Inter-Operator Roaming, Vehicular Technology Conference, 2004. VTC 2004-Spring. 2004 IEEE 59th (vol. 5 ) , pp. 2492-2496.*
B. Anton, B. Bullock and J.Short, "Best Current Practices for Wireless Internet Service Provider (WISP) Roaming", Wi-Fi Alliance, Wirelss ISP Roaming (WISPr), Release Date: Feb. 2003, Version 1.0, 37 pgs.
"Guide to Easy Wi-Fi", http://www.devicescape/cp,/learn/easy_wi_fi_iphone, Feb. 27, 2009, 13 pgs.

* cited by examiner

*Primary Examiner* — Andrew Nalven
*Assistant Examiner* — Roderick Tolentino
(74) *Attorney, Agent, or Firm* — Park, Vaughan, Fleming & Dowler LLP (57) ABSTRACT

A method and apparatus of to negotiate access with a captive network is described. In an exemplary method, a mobile client detects, with a network interface, a network. The mobile client associates with the network, where associating allows the mobile client to communicate with the network. In addition, the mobile client probes the network by requesting a web page, where the web page is independent of the network. In response to the web page request, the mobile client receives a capture web page. The mobile client determines the type of authentication used for the network based on the received capture web page.

36 Claims, 7 Drawing Sheets

Fig. 7

CAPTIVE NETWORK NEGOTIATION INTERFACE AND AUTOMATION

FIELD OF THE INVENTION

This invention relates generally to connecting to a network and more particularly to automatically negotiating access to a captive network.

BACKGROUND OF THE INVENTION

A variety of Wireless Internet Service Providers (ISP) provides hotspots at various locations around the world. A hotspot is a venue that offers Wireless Local Area Network (WLAN) access to a network, such as the Internet. These hotspots can appear as unprotected WLANs. However, these hotspots break the assumption that once a network link comes up on a mobile client with the WLAN and an Internet Protocol (IP) address is acquired by the mobile client, that the mobile client will have Internet connectivity. Instead, these networks redirect hypertext transfer protocol (HTTP) traffic to a capture web page and block some or all other IP traffic until the user has agreed to terms and conditions, authenticate to the network, and/or purchased access. These types of networks are called captive networks. This model requires user intervention every time a user joins the WLAN. For example, WLAN service is free and the user simply has to click on a button in a web page to indicate that the user agrees to the terms of the service before the mobile client is allowed access. Alternatively, the user must provide some sort of credentials (e.g., username and/or password) to access the Internet via the WLAN. Thus, in this model, the user must know to launch a web browser and attempt to load a web page in order to access the Internet through one of these networks.

The act of associating with a WLAN often involves no user interaction. A mobile client can automatically associate with a WLAN network if the mobile client has associated with that WLAN in the past. A mobile client can also support both WLAN and cellular data service, where the cellular data service is also available. Associating such a mobile client with a captive network breaks the seamless networking experience because the mobile client will associate with the captive network without gaining Internet access and drop the cellular data service connection. Applications that handle mail, weather, and stock information, for example, will stop working because the user walked by a venue and this mobile client joined the hotspot corresponding to the venue. It would be useful to automatically negotiate access to a captive network without dropping data connections to other networks.

SUMMARY OF THE DESCRIPTION

A method and apparatus of to negotiate access with a captive network is described. In an exemplary method, a mobile client detects, with a network interface, a network. The mobile client associates with the network, where associating allows the mobile client to communicate with the network. In addition, the mobile client probes the network by requesting a web page, where the web page is independent of the network. In response to the web page request, the mobile client receives a capture web page. The mobile client determines the type of authentication used for the network based on the received capture web page.

BRIEF DESCRIPTION OF THE DRAWINGS

The present invention is illustrated by way of example and not limitation in the figures of the accompanying drawings in which like references indicate similar elements.

DETAILED DESCRIPTION

A method and an apparatus to negotiate access with a captive network is described. In the following description, numerous specific details are set forth to provide thorough explanation of embodiments of the present invention. It will be apparent, however, to one skilled in the art, that embodiments of the present invention may be practiced without these specific details. In other instances, well-known components, strictures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

A method and apparatus for negotiating access to a captive network is described. In one embodiment, a mobile client associates with a captive network using a wireless network. In this embodiment, the mobile client probes the captive network to determine the type of authentication used for the captive network. The probe used by the mobile client is a web page that is known to the mobile client and independent of the captive network. Based on the response to the probe, the mobile client can attempt to automatically authenticate with the captive network using stored credentials or display a user interface for the user perform an action to access the captive network. In addition, the mobile client can optionally switch to a secondary network interface from a primary network interface during the authentication process with the captive network to continue network access for the mobile client during the authentication process. For example, the mobile client switches a secondary cellular data network interface to the primary interface. Upon successful authentication, the mobile client switches this new primary network interface back to secondary status and makes the network interface that communicates with the captive network primary. Furthermore, the mobile client can scrape an authentication request for user credentials. The mobile client caches the scraped user credentials to use for automatic authentication with the captive network.

Figure 1:
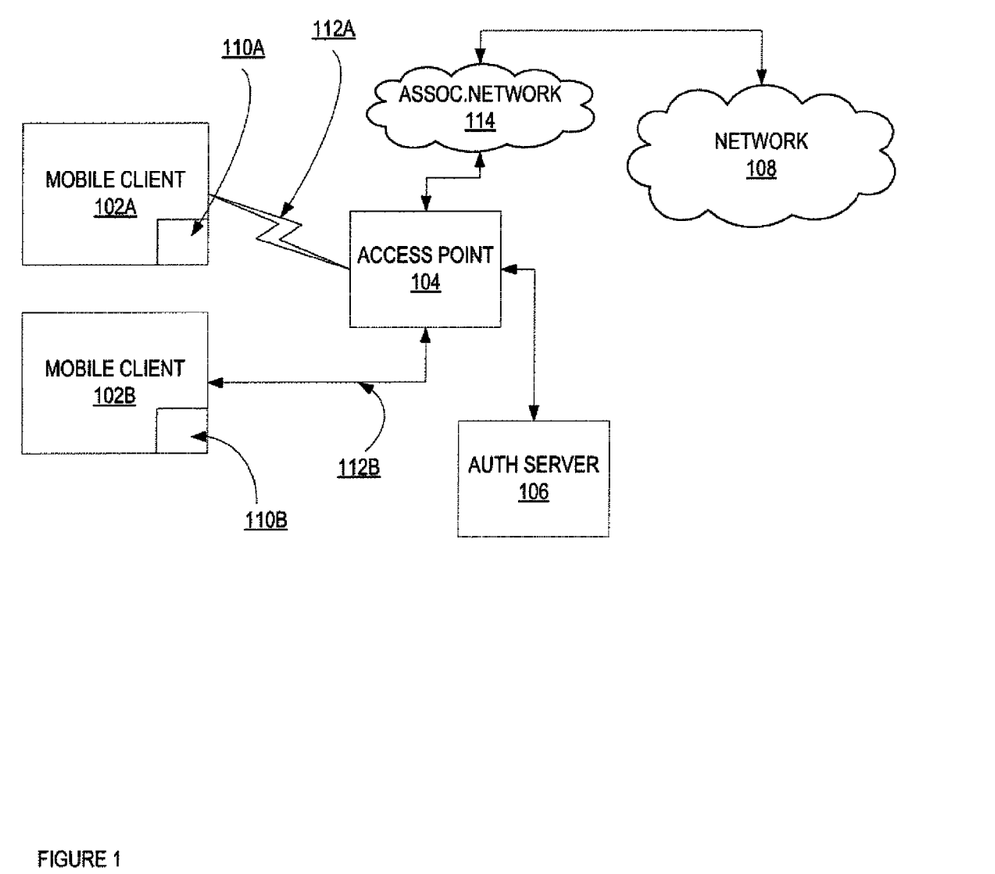
FIG. 1 is a block diagram of mobile clients connecting to an access point to gain access to a network.

FIG. 1 is a block diagram of mobile clients 102A-B connecting to an access point 104 to gain access to network 108. In FIG. 1, mobile clients 102A-B couple to access point 104 via wireless connection 112A for mobile client 102A or wired connection 112B for mobile client 102B. Mobile clients 102A-B use connections 112A-B to access network 108. Wireless connection 112A is a wireless networking protocol as known in the art such as Wireless Local Area Network based protocols (802.11a, 802.11b, 802.11b, 802.11n, etc.), WIMAX, etc.). Wired connection 112B is a wired networking protocol known in the art, such as Ethernet, etc. While in one embodiment, network 108 is the public Internet, in alternative embodiments, network 108 is different type of network (private network, etc.).

Access point 104 is a network device that couples mobile clients 102A-B to network 108 via captive network 114. In one embodiment, access point 104 allows network access upon association of mobile clients 102A-B with captive network 114. Association means herein that mobile client 102A-B has connected with access point 104 and mobile client 102A-B can communicate with access point 104 and/or captive network 1114. In one embodiment, association includes assignment of a network address to mobile client 102A-B by access point 104. For example, and in one embodiment, access point 104 assigns an Internet Protocol (IP) address to mobile client 102A-B. Mobile client 102A-B is one of a smartphone, cellular phone, music player, laptop, notebook, tablet, personal digital assistant, netbook, palmtop computer, etc.

Captive network 114 is the network of a service provider that is providing access for mobile clients 102A-B to network 108. A captive network is a network that requires some sort of action by mobile client 102A-B beyond associating to gain access to other networks, such as network 108. An example of a captive network is a typical wireless network at a hotel which, upon initial association, presents a login web page before another web page can be accessed. In one embodiment, captive network 114 includes access point 104. In a further embodiment, captive network 114 is a WLAN and the service provider is a Wireless Internet Service Provider (ISP).

In another embodiment, access point 104 communicates with mobile clients 102A-B, but requires further action by mobile clients 102A-B to gain access to network 108. While in one embodiment, mobile client 102A-B presents an identification to access point 104 to access network 108, in alternative embodiments, mobile clients 102A-B perform some other action used to access network 108 (agree to terms of service, purchase access, etc. and/or combination thereof). Identification credentials can be any type of identification credentials known in the art, such as username and/or password combination, certificates, etc. Credentials are discussed further with reference to FIG. 3 below. In one embodiment, access point 104 authenticates mobile clients 102A-B via authentication server 106.

When mobile client 102A-B associates with a captive network, mobile client 102A-B probes captive network 114 to determine the type of authentication used by captive network 114 to gain access to network 108. In this embodiment, captive network 114 can be part of Wireless Internet Service Provider roaming (WISPr) network or a non-WISPr network. WISPr is a specification of a standard developed to handle roaming of a mobile client from one ISP to another ISP. This standard defines how to handle authentication and billing between wireless ISPs, which are handled in the wireless ISP's network. In addition, WISPr covers a standardized way of accessing a capture pages that a mobile client can use to determine how to access a WISPr network. In one embodiment, a capture page includes information on how to access network 108, and can include links to create an account or sign in using an existing account. Furthermore, WISPr includes a description of a "SmartClient" that uses eXtended Markup Language (XML) embedded in the capture page to authenticate the user without getting a web browser involved. Current WISPr implementations use Hypertext Transport Protocol (HTTP) requests to authenticate and are limited to using HTTP POST to send credentials.

However, the WISPr and other standards specifications lack description on how to load a capture page. The WISPr standard recommends that the mobile client probe for the capture page by issuing an HTTP GET when a Service Set Identification (SSID) of an available network is known to support WISPr. Nonetheless, it is unlikely that a mobile client would know in advance which uniform resource locator (URL) to use for all possible WISPr-supported capture pages.

In one embodiment, mobile clients 102A-B include network access modules 110A-B, respectively, that detect the type of authentication used by captive network 114 and negotiates access to network 108. Based on the authentication type of captive network 114, network access module 110A-B attempts to authenticate with that network by transmitting credentials, if available, or presenting a user interface on the mobile client for the user to enter in credentials to access this network 108. In one embodiment, network access module 110A-B attempts to make use of a secondary network interface to allow applications running on the mobile client to access the network 108, while the user enters in the credentials. In this embodiment, network access module 110A-B further attempts to scrape the entered credentials so as to cache these credentials. These cached credentials can be used later by network access module to gain access for this network. Negotiating network access is further described in FIG. 3 below.

Figure 2:
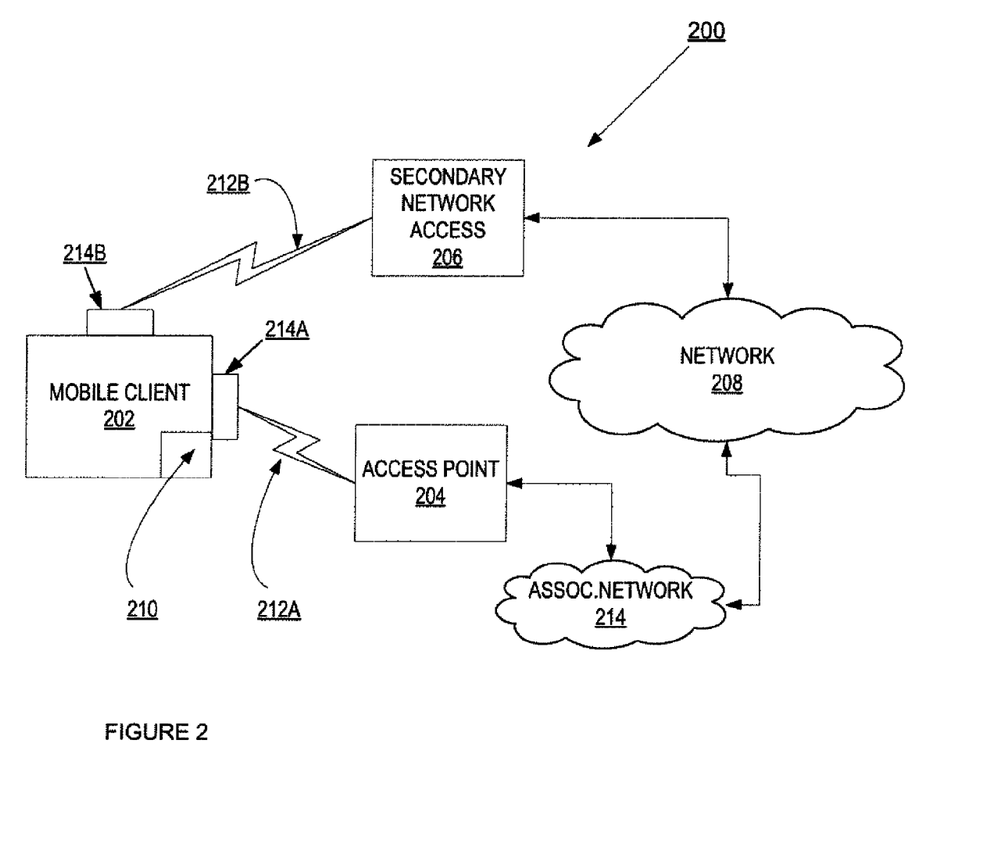
FIG. 2 are block diagrams of one embodiment of a mobile client with primary and secondary interfaces that are used to access a network.

In one embodiment, a network access module can take advantage of a mobile client that comprises two network interfaces. The network access module uses this secondary network interface to continue network communications for applications that are running on the mobile client while the mobile client negotiates network access on a primary network interface. FIG. 2 is block diagram of one embodiment of a mobile client 202 with primary 214A and secondary 214B interfaces that are used to access a network 208. In FIG. 2, mobile client 202 can access network 208 via captive network 216 and network connection 212A and/or via secondary wireless access 206 and network connection 212B. Network connection 212A-B each can be one of the network connections known in the art: WLAN (801.11a, 801.11b, 801.11g, 801.11n, WIMAX, etc.), cellular data connection (EDGE, 3G, etc.), and/or wired (Ethernet, etc.). Network connections 212A-B can be the same or different type of connection. Network 208 can be the Internet, a private network, or other network that can be accessed via access point 204. Captive network 214 is a captive network as described in FIG. 1 above.

In one embodiment, network access module 210 of mobile client 202 associates with access point 204. In this embodiment, network access module 210 uses primary interface 214A to communicate with access point 204 to negotiate access to network 208. While network access module 210 is negotiating access with access point 204, mobile client uses secondary interface 214B via network connection 212B and secondary network access 206 to access network 208 for one or more applications running on mobile client that require access to network 208. For example, and in one embodiment, applications that require network access are e-mail clients, current weather and/or stock price applications, etc. and/or any application known in the art that retrieves or transmits data with network 208. When network access module 210 successfully negotiates access to network 208 with access point 204, mobile client 202 uses primary interface 214A as the interface for applications needing access to network 208. In one embodiment, network access module 210 switches the order of interfaces 214A-B so that primary interface 214A is secondary and secondary interface 214B is primary during the negotiation. Once the network access module 210 completes the negotiation, network access module 210 switches the order of the network interfaces back so that network interface 214A is primary and network interface 214B is secondary.

Similar to FIG. 1, captive network 216 is the network of a service provider that is providing network access to mobile client 202 In one embodiment, captive network 216 includes access point 204. In a further embodiment, captive network 216 is a WLAN and the service provider is a Wireless ISP.

Figure 3:
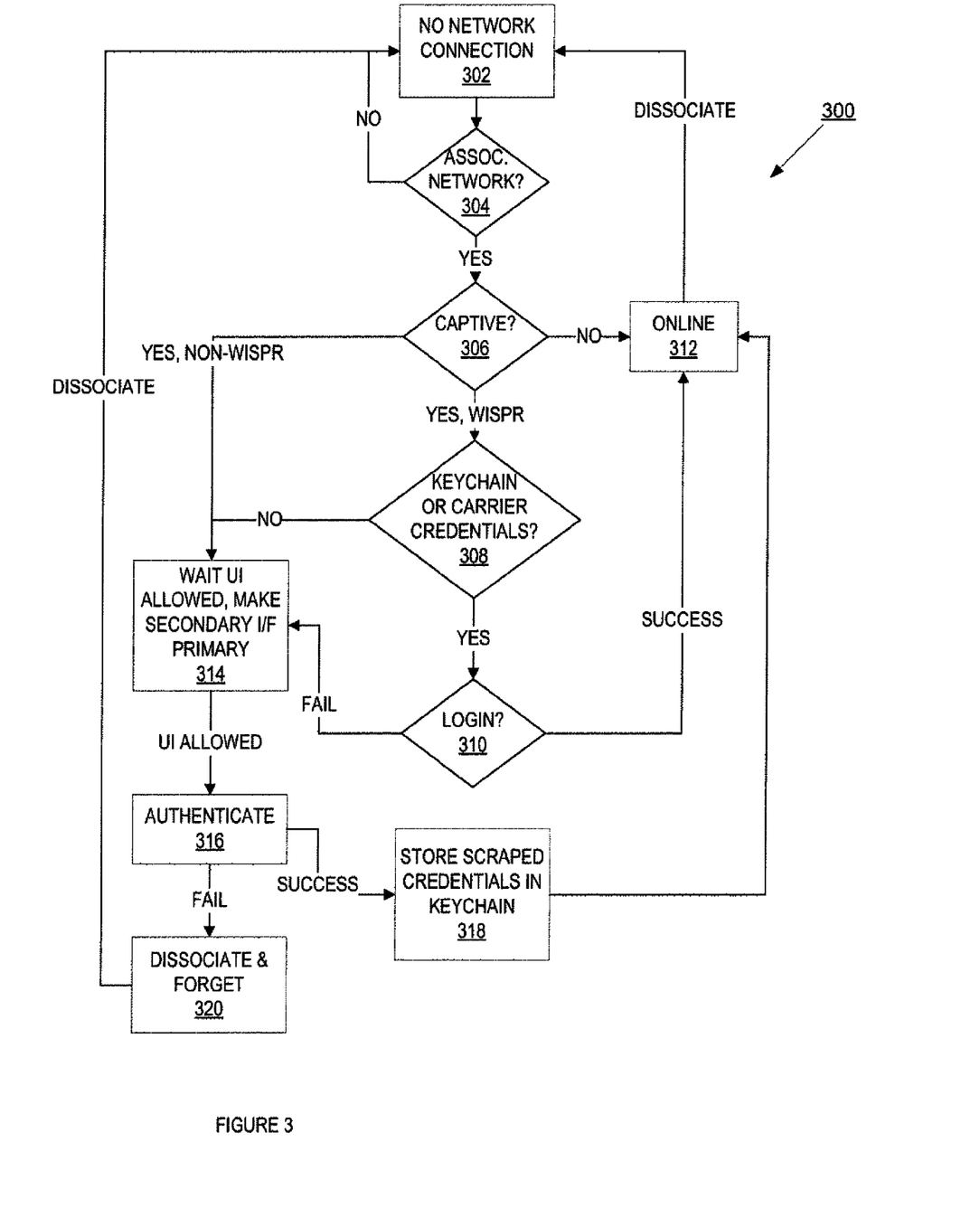
FIG. 3 is a flow diagram of one embodiment of a process to negotiate access with a captive network.

In this embodiment, network access via access point 204 and network connection 212A is more advantageous (faster, cheaper, etc.) than network access via secondary network access 206. In one embodiment, network connection 212A is a WLAN connection and access point 204 is a WLAN hotspot whereas secondary network access 206 is a cellular network access and secondary network connection 212B is a cellular data connection as known in the art. Negotiation network access is further described in FIG. 3 below, FIG. 3 is a flow diagram of one embodiment of a process 300 to negotiate access with a captive network. In one embodiment, process 300 is executed by the network access module as described in FIGS. 1 and/or 2. In another embodiment, process 300 executes a web sheet application that negotiates access with the captive network. In this embodiment, the web sheet application appears as a mini-web browser to the user. This application provides a web view that the user can navigate. As each new page loads, the web sheet application probes the captive network as described below at block 306.

In FIG. 3, at block 302, process 300 initially does not have a network connection for the primary interface. In one embodiment, process 300 has only the primary interface for the network communications and thus, in this embodiment, process 300 has no network communications available. In an alternate embodiment, process 300 has a secondary network interface available for network communications. For example, and in one embodiment, process 300 has a WLAN type of connection for the primary interface and a cellular data connection for the secondary connection.

At block 304, process 300 attempts to associate with available networks on the primary interface. In one embodiment, process 300 attempts to associate with a WLAN that is available to mobile client 202 as described in FIG. 2. For example, and in one embodiment, process 300 attempts to associate with a WLAN network as the mobile client comes within ranges of a local WLAN network. In this example, the mobile client comes within range of a local shop and process 300 attempts to associate with a WLAN network situated in the local shop. Furthermore, in one embodiment, process 300 attempts to associate with the captive network using WLAN authentication as known in the art (WiFi Protected Access (WPA), WPA2, Wired Equivalency Privacy (WEP), etc.)

In a further embodiment, process 300 can associate with a plurality of available captive networks. In this embodiment, process 300 attempts to associate with one of the plurality of captive networks that are known to process 300. For example, and in one embodiment, process 300 can associate with three different captive networks. In this example, one of these captive networks is known to process 300 and the other two are not. A known network is a captive network that process 300 has successfully negotiated access to in the past. Process 300 chooses to associate with the known captive network first. If process 300 cannot associate with the known captive network, process 300 chooses one of unknown networks in order to associate.

In another embodiment, if process 300 has multiple networks available to associate with, process 300 displays a list of available networks to allow a user to select which network process 300 should attempts to associate and/or negotiate access.

In still further embodiment, process 300 is currently connected with one captive network and learns of another network that process 300 can associate with. In this embodiment, process 300 can automatically disassociate with the current captive network and attempt to associate with the new network. Alternatively, process 300 can continue to stay coupled to the current captive network and alert the user that there is a new network that is available. In this alternative embodiment the applications of mobile client can access services on the current captive network, continue to use the secondary network for other network service (e.g., cellular data network), and the user of the mobile client can opt to connect to another network. For example and in one embodiment, process 300 continues the association with a current captive network, where the mobile client can download music using this captive network, while using an EDGE or 3G cellular data network for other network services. Furthermore, process 300 can alert the user of the mobile client that another WLAN is available.

If process 300 cannot associate with the available networks, process 300 proceeds back to block 302 where process 300 is not associated with a network on the primary interface. If process 300 does associate with the available network on the primary interface, process 300 probes the associated network to determine the type of associated network at block 306. In one embodiment, the associated network can be one of three types: a non-captive network, a WISPr support captive network, or a non-WISPr network. Process 300 determines this associated network type by the response to the probe. In one embodiment, process 300 probes to determine associated network type by performing a web page request that is known to the mobile client and is independent of the associated network and its corresponding ISP. A web page that is independent means herein that the operator of the web server for the web page is different than the operator of the captive network. In one embodiment, an independent web page is a web page that exists outside the walled garden of the captive network. In another embodiment, the independent web page is a web page associated with the manufacturer of the mobile client. In one embodiment, the web page request is an HTTP GET request to a standard web page known to the mobile client, where the web page is associated to the manufacturer of the mobile client. For example, and in one embodiment, the requested web page includes the text "SUCCESS!" In one embodiment, a captive network's walled garden is a closed or exclusive set of network services provided for users of the captive network.

In an alternate embodiment, process 300 probes the associated network by accessing a resource location on a network device located outside the associated network. For example, and in one embodiment, process 300 can ping a known network device that is independent of the associated network. Similar to above, an independent network device means that the operator of the network device is different than the operator of the associated network. In another embodiment, the network device is outside the walled garden of the associated network. The network device can be a web server, router, server, bridge, etc., or other network device known in the art.

If the associated network is not a captive network, process 300 determines that the mobile client is online and available to access the network at block 312. In one embodiment, process 300 determines that the associated network is not a captive network by receiving the web page that was requested.

If the associated network is a captive network, process 300 further determines if the captive network is a WISPr supported network or a non-WISPr network at block 306. For a captive network, the requested web page is redirected to a capture page. If the capture page includes a WISPr-supported XML, process 300 identifies the associated network as a WISPr-supported network and execution proceeds to block 308. If the capture page does not include the WISPr-supported XML, process 300 identifies the associated network as a non-WISPr network and execution proceeds to block 314.

At block 308, process 300 determines if there are stored credentials that can be used to authenticate with the WISPr-supported associated network. While in one embodiment, credentials are a username and password, in alternate embodiments, credentials are some other information that is used to authenticate and gain access to the network (certificate, etc.). In one embodiment, process 300 determines if the appropriate credentials are stored in the keychain of the mobile client. If the appropriate credentials exist, process 300 attempts to login to the associated network at block 310. If the login succeeds, process 300 determines that the mobile client is online and available to access the network at block 312. If the login fails, executions proceed to block 314.

Alternatively, if it is unclear whether there are additional costs associated with authenticating to the associated network (e.g., per minute charges, per session charges, etc.), process 300 does not automatically authenticate with the stored credentials, even if the stored credentials are appropriate for the associated network. In one embodiment, process 300 determines cost by sending an authentication requests with a null password. In this embodiment, process 300 receives a reply with a field indicating costs to access to a network (e.g., the Internet) through the captive network. In this embodiment, execution proceeds to block 314.

At block 314, process 300 displays a user interface on the mobile client that the mobile client user can use to login into the associated network. In this embodiment, the user enters their credentials that are used to authenticate with the associated network. In one embodiment, the user interface is the capture page of the non-WISPr network as described at block 306 above. In another embodiment, the user interface is a web page referenced by a login URL included in the WISPr-XML.

In one embodiment, the user enters a username and/or passwords via the user interface. In a further embodiment, the user enters a realm in addition to the username and/or password. A realm is an identifier used to identify a WLAN service provider. In this embodiment, the realm identifier is used to identify the mobile client when the mobile client roams from one WLAN service provider to another. For example, and in one embodiment, if a mobile client has an account with service provider 1 and moves from this service provider to another service provider, the mobile client can authenticate with the new service provider using the realm for service provider 1 as part of the user credentials.

In a further embodiment, process 300 additionally makes the secondary network interface the primary interface for applications that require network communications at block 314. In one embodiment, process 300 switches the order of the primary and secondary network interfaces as described above with reference to FIG. 2, above.

At block 316, process 300 executes an application that allows the user to enter credentials in order to authenticate to the associated network. In addition, process 300 attempts to scrape the credentials. In one embodiment, process 300 scrapes the credentials by extracting the credentials used to authenticate. For example, and in one embodiment, process 300 extracts the username, password and other information from the HTTP GET or HTTP POST used to authenticate. In this example, process 300 identifies the fields in the HTTP POST named "username," "password," and/or "realm," and extracts the data associated with these fields. If process 300 is not successful in authenticating to the associated network, process 300 dissociates from the associated network and forgets the associated network at block 320. In one embodiment, process 300 dissociated from the associated network by dropping the WLAN connection with the associated network. In another embodiment, process 300 stores the service set identifier of the associated network. In this embodiment, process 300 does not try to automatically join this network again unless instructed by the user. Execution proceeds to block 302, where process 300 is not associated with a network.

If process 300 successfully authenticates, process 300 stores the scraped credentials in the keychain of the mobile client at block 318. In addition, process 300 stores the service set identifier of the captive network as a known network.

While process 300 has been described with reference to an associated network that is a wireless network, in an alternate embodiment, process 300 can be used by a mobile client that associates with an associated network via a wired network connection (Ethernet, etc.). For example, and in one embodiment, process 300 is used by a mobile client using a wired connection in a hotel.

Figure 4:
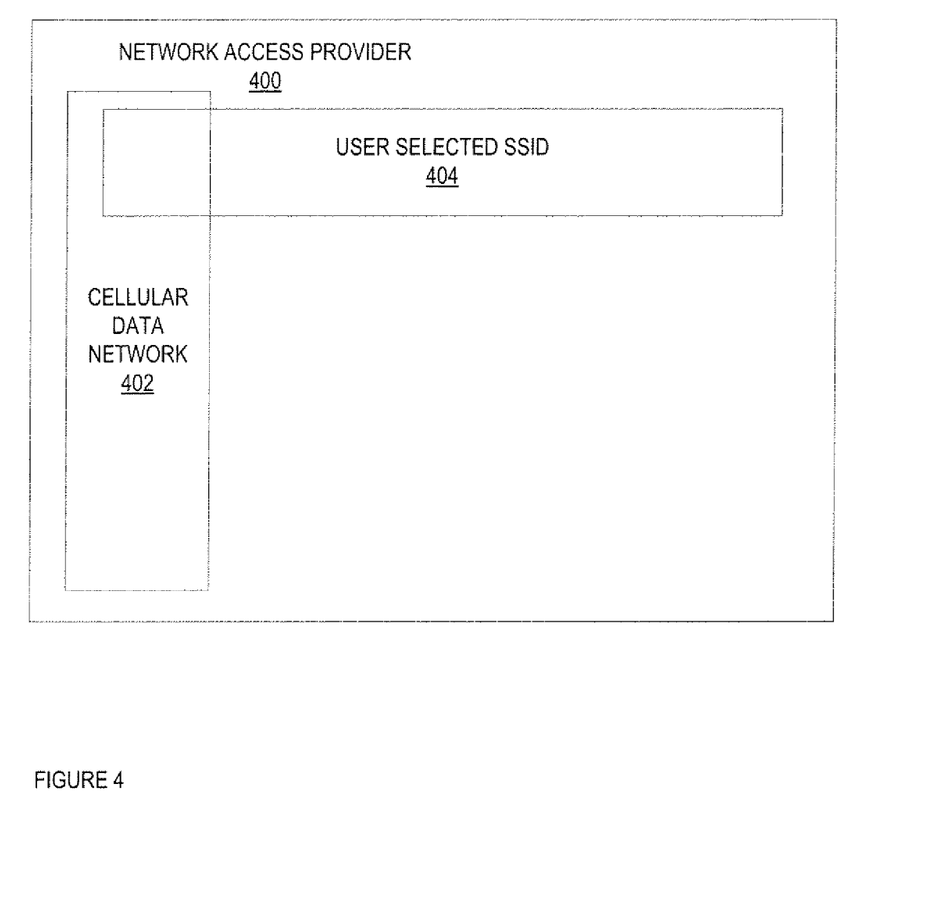
FIG. 4 is a block diagram of network access provider's different wireless access networks.

FIG. 4 is a block diagram of network access provider 400 different wireless access networks. In FIG. 4, network access provider 400 comprises cellular data network 402 and user selected SSID WLAN network 404. In one embodiment, access to these network overlaps where either network is accessible to a mobile client.

Figure 5:
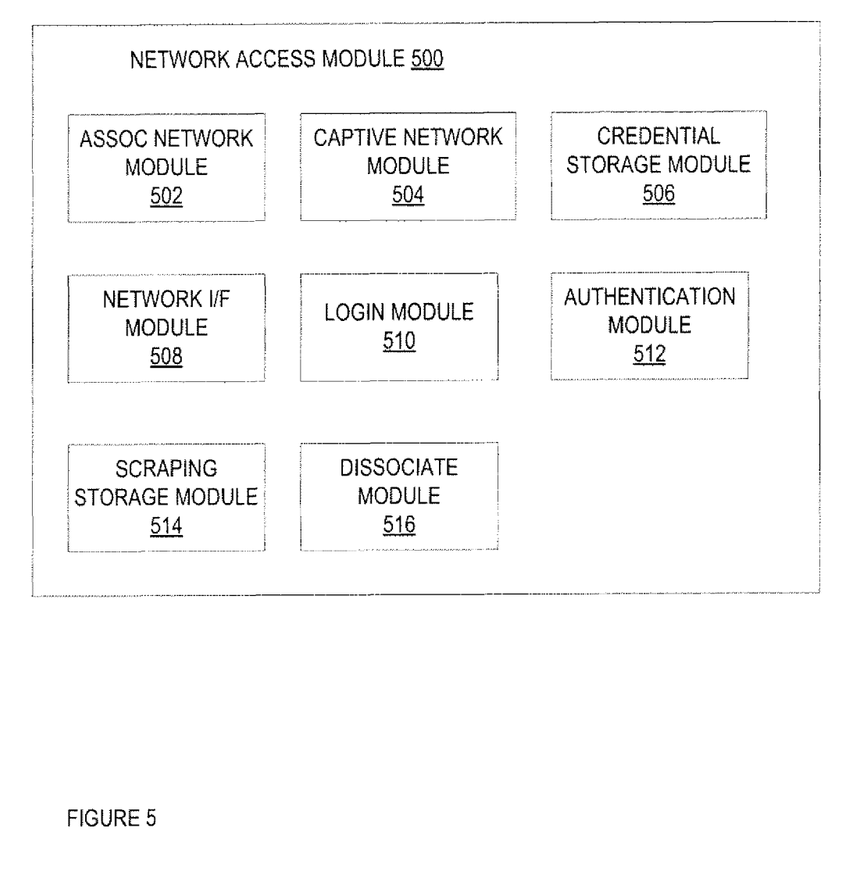
FIG. 5 is a block diagram of mobile client network access module to negotiate access with a captive network.

FIG. 5 is a block diagram of mobile client network access module 500 to negotiate access with a captive network. In one embodiment network access module 500 is network access module 110A-B in mobile clients 102A-B as described with reference to FIG. 1 above. Network access module comprises associated network module 502, captive network module 504, credential storage module 506, network interface module 508, login module 510, authentication module 514, scraping storage module 514, and dissociate module 516. Associated network module 502 attempts to associate with a network as described in FIG. 3, block 304. Captive network module 504 determines the type of associated network as described in FIG. 3, block 306. Credential storage module 506 determines if the appropriate credentials are stored as described in FIG. 3, block 308. Network interface module 508 makes the secondary interface primary, and visa versa, as described in FIG. 3, block 314. Login module 510 attempts to authenticate with a WISPr supported network using the stored credentials as described in FIG. 3, block 310. Authentication module 512 executes the web sheet application that authenticates with the associated network and scrapes the credentials as described in FIG. 3, block 316. Scraping storage module 514 stores the scraped credentials as described in FIG. 3, block 318. Dissociate module 516 dissociates a network interface from the associated network as described in FIG. 3, block 320.

Figure 6:
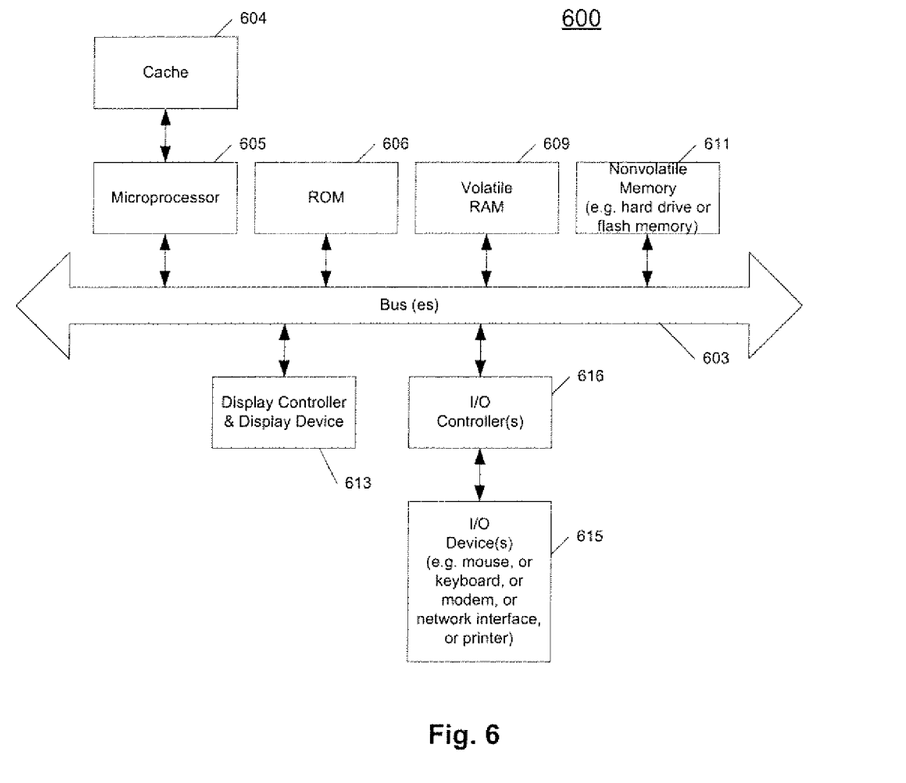
FIG. 6 illustrates one example of a typical computer system which may be used in conjunction with the embodiments described herein.
Figure 7:
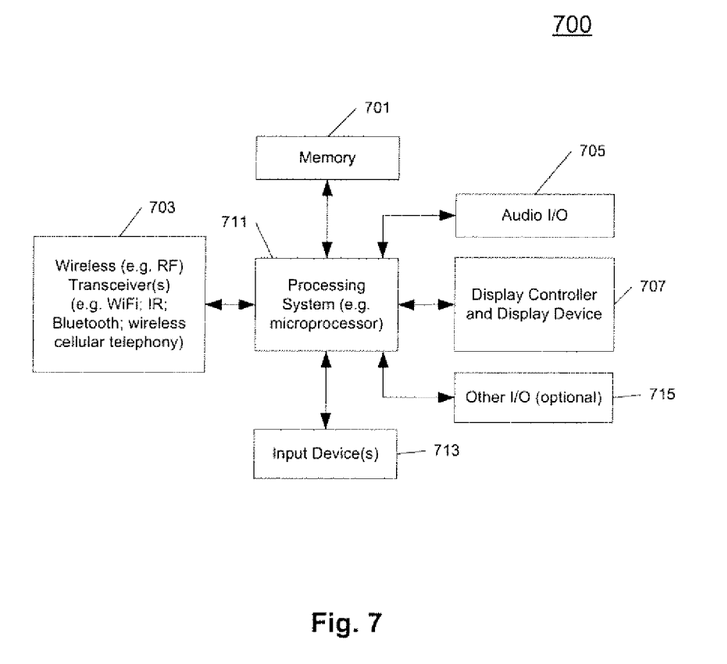
FIG. 7 shows an example of a data processing system which may be used with one embodiment of the present invention.

FIG. 6 shows one example of a data processing system 600, which may be used with one embodiment of the present invention. For example, the system 600 may be implemented including a host as shown in FIG. 7. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

FIG. 7 shows an example of another data processing system 700 which may be used with one embodiment of the present invention. For example, system 700 may be implemented as part of system as shown in FIG. 1. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone.

A display controller and display device 707 provide a visual user interface for the user: this digital interface may include a graphical user interface which is similar to that shown on a Macintosh computer when running OS X operating system software. The system 700 also includes one or more wireless transceivers 703 to communicate with another data processing system, such as the system 700 of FIG. 7. A wireless transceiver may be a WLAN transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713 which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 700 may be a network computer or an embedded processing device within another device, or other types of data processing systems which have fewer components or perhaps more components than that shown in FIG. 7.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "associating," "probing," "receiving," "authenticating," "enabling," "disabling," "scraping," "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computerized method comprising:
    detecting, with a first network interface of a mobile client, a first network, wherein the first network interface is a primary interface of the mobile client and the primary interface of the mobile client allows an application running on the mobile client to communicate with a third network;
    associating with the first network, wherein associating allows the mobile client to communicate with the first network;
    probing the first network by accessing a resource location on a network device located outside the first network, wherein the resource location is independent of the first network;
    receiving a second web page in response to the resource location request, wherein the second web page is not the resource located at the resource location;
    in response to receiving a second web page that is not the resource located at the resource location, switching the primary interface of the mobile client from the primary network interface to a secondary network interface, wherein the secondary interface allows the application to access the resource located at the resource location;
    determining a type of authentication for the first network based on the received second web page;
    authenticating with the first network; and
    upon successful authentication with the first network, switching the primary interface of the mobile client from the second network interface back to the first network interface, wherein the primary interface now allows the application to access the resource located at the resource location.

2. The computerized method of claim 1, wherein the second web page is a capture web page associated with the first network.

3. The computerized method of claim 1, wherein the authenticating with the first network is based on the determined type of authentication.

4. The computerized method of claim 1, wherein the first network is a Wireless Local Area Network (WLAN).

5. The computerized method of claim 1, wherein the authenticating further comprises:
displaying a user interface to authenticate with the first network.

6. The computerized method of claim 1, wherein the second network is a cellular data network.

7. The computerized method of claim 1, wherein the authenticating the authenticating further comprises:
scraping a credential from an authentication request that is used to authenticate a user with the first network.

8. The computerized method of claim 7, wherein the scraping comprises extracting the credential from a hypertext transport protocol POST form.

9. The computerized method of claim 1, wherein the first network is a Wireless Internet Service Provider Roaming (WISPr) supported network and the second web page includes an indication of how the mobile client can authenticate with the first network.

10. The computerized method of claim 1, wherein the first network is a non-WISPr network and the second web page includes a web-based login screen that is used to authenticate with the first network.

11. The computerized method of claim 1, wherein the accessing a resource location is a web page request for a first web page.

12. The computerized method of claim 1, wherein the mobile client is one of smartphone, cellular phone, music player, laptop, notebook, tablet, personal digital assistant, netbook and palmtop computer.

13. The computerized method of claim 1, wherein the resource is located on the Internet.

14. A non-transitory machine-readable medium having executable instructions to cause a processor to perform a method comprising:
detecting, with a first network interface of a mobile client, a first network, wherein the first network interface is a primary interface of the mobile client and the primary interface of the mobile client allows an application running on the mobile client to communicate with a third network;
associating with the first network, wherein associating allows the mobile client to communicate with the first network;
probing the first network by accessing a resource location on a network device located outside the first network, wherein the resource location is independent of the first network;
receiving a second web page in response to the first web page request, wherein the second web page is not the resource located at the resource location;
in response to receiving a second web page that is not the resource located at the resource location, switching the primary interface of the mobile client from the primary network interface to a secondary network interface, wherein the secondary interface allows the application to access the resource located at the resource location;
determining a type of authentication for the first network based on the received second web page;
authenticating with the first network; and
upon successful authentication with the first network, switching the primary interface of the mobile client from the second network interface back to the first network interface, wherein the primary interface now allows the application to access the resource located at the resource location.

15. The non-transitory machine-readable medium of claim 14, wherein the second web page is a capture web page associated with the first network.

16. The machine-readable medium of claim 14, wherein the authenticating with the first network is based on the determined type of authentication.

17. The non-transitory machine-readable medium of claim 14, wherein the first network is a Wireless Local Area Network (WLAN).

18. The non-transitory machine-readable medium of claim 14, wherein the authenticating further comprises:
displaying a user interface to authenticate with the first network.

19. The non-transitory machine-readable medium of claim 14, wherein the second network is a cellular data network.

20. The non-transitory machine-readable medium of claim 14, further comprising:
scraping a credential from an authentication request that is used to authenticate a user with the first network.

21. The non-transitory machine-readable medium of claim 20, wherein the scraping comprises extracting the credential from a hypertext transport protocol POST form.

22. The non-transitory machine-readable medium of claim 14, wherein the first network is a Wireless Internet Service Provider Roaming (WISPr) supported network and the second web page includes an indication of how the mobile client can authenticate with the first network.

23. The non-transitory machine-readable medium of claim 14, wherein the first network is a non-WISPr network and the second web page includes a web-based login screen that is used to authenticate with the first network.

24. The non-transitory machine-readable medium of claim 14, wherein the resource is located on the Internet.

25. A system comprising:
a processor;
a memory coupled to the processor through a bus; and
a process executed from memory by the processor to cause the processor to perform the following:
to detect, with a first network interface of a mobile client, a first network, wherein the first network interface is a primary interface of the mobile client and the primary interface of the mobile client allows an application running on the mobile client to communicate with a third network;
to associate with the first network, wherein associating allows the mobile client to communicate with the first network;
to probe the first network by accessing a resource location on a network device located outside the first network, wherein the resource location is independent of the first network;
to receive a second web page in response to the first web page request, wherein the second web page is not the resource located at the resource location;
in response to receiving a second web page that is not the resource located at the resource location, to switch the primary interface of the mobile client from the primary network interface to a secondary network interface, wherein the secondary interface allows the application to access the resource located at the resource location;
to determine a type of authentication for the first network based on the received second web page;
to authenticate with the first network; and upon successful authentication with the first network, to switch the primary interface of the mobile client from the second network interface back to the first network interface, wherein the primary interface now allows the application to access the resource located at the resource location.

26. The system of claim 25, wherein the second web page is a capture web page associated with the first network.

27. The system of claim 25, wherein the authenticate with the first network is based on the determined type of authentication.

28. The system of claim 25, wherein the first network is a Wireless Local Area Network (WLAN).

29. The system of claim 25, wherein, to authenticate, the process further causes the processor to display a user interface to authenticate with the first network.

30. The system of claim 27, wherein the process further causes the processor to switch the primary interface of the mobile client from the second network interface to the first network interface.

31. The system of claim 25, wherein the second network is a cellular data network.

32. The system of claim 25, wherein the process further causes the processor to scrape a credential from an authentication request that is used to authenticate a user with the first network.

33. The system of claim 25, wherein the scraping comprises extracting the credential from a hypertext transport protocol POST form.

34. The system of claim 25, wherein the first network is a Wireless Internet Service Provider Roaming (WISPr) supported network and the second web page includes an indication of how the mobile client can authenticate with the first network.

35. The system of claim 25, wherein the first network is a non-WISPr network and the second web page includes a web-based login screen that is used to authenticate with the first network.

36. The apparatus of claim 25, wherein the resource is located on the Internet.

* * * * *